(12) United States Patent
Grasser et al.

(10) Patent No.: US 7,719,766 B2
(45) Date of Patent: May 18, 2010

(54) ILLUMINATION SOURCE AND METHOD THEREFOR

(75) Inventors: Regis Grasser, Mountain View, CA (US); Steven Werner Gensler, San Jose, CA (US); James Christopher Dunphy, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 80 days.

(21) Appl. No.: 11/765,941

(22) Filed: Jun. 20, 2007

(65) Prior Publication Data

US 2008/0316567 A1 Dec. 25, 2008

(51) Int. Cl.
*G02B 27/10* (2006.01)
(52) U.S. Cl. .................. 359/618; 362/802
(58) Field of Classification Search .......... 359/618; 362/551, 553, 555, 559, 583, 802
See application file for complete search history.

(56) References Cited

U.S. PATENT DOCUMENTS

| | | | |
|---|---|---|---|
| 5,706,061 A | 1/1998 | Marshall et al. | |
| 6,054,832 A | 4/2000 | Kunzman et al. | |
| 6,304,706 B1 | 10/2001 | Sugita et al. | |
| 6,313,938 B1 | 11/2001 | Shikii et al. | |
| 6,520,648 B2 | 2/2003 | Stark et al. | |
| 6,735,224 B2 | 5/2004 | Murry et al. | |
| 7,423,802 B2* | 9/2008 | Miller | 359/326 |

FOREIGN PATENT DOCUMENTS

WO 2006027866 A1 3/2006

* cited by examiner

*Primary Examiner*—William C Choi
(74) *Attorney, Agent, or Firm*—Charles A. Brill; Wade James Brady, III; Frederick J. Telecky, Jr.

(57) ABSTRACT

An illumination source and a method therefor. A light source includes a light circuit configured to process light and direct light, and a lighting element optically coupled to the light circuit to provide multiple colors of light. The light circuit propagates light using light guides. The use of light guides eliminates the use of free space optical elements, enabling the creation of more compact light sources. Furthermore, the use of light guides may enable the creation of light sources with fewer mechanical restrictions, thereby making the light sources potentially more reliable and less expensive.

20 Claims, 4 Drawing Sheets

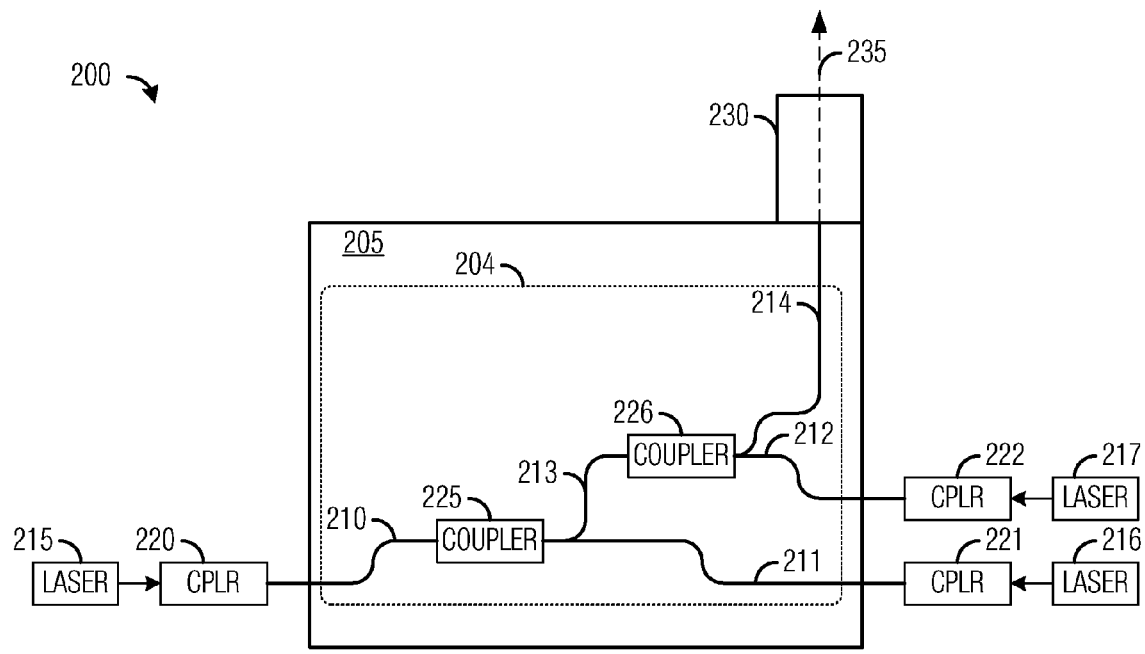
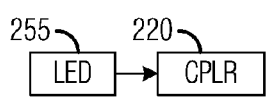 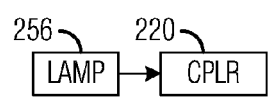 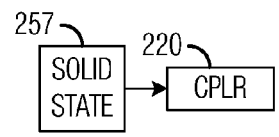
*Fig. 2b*  *Fig. 2c*  *Fig. 2d*
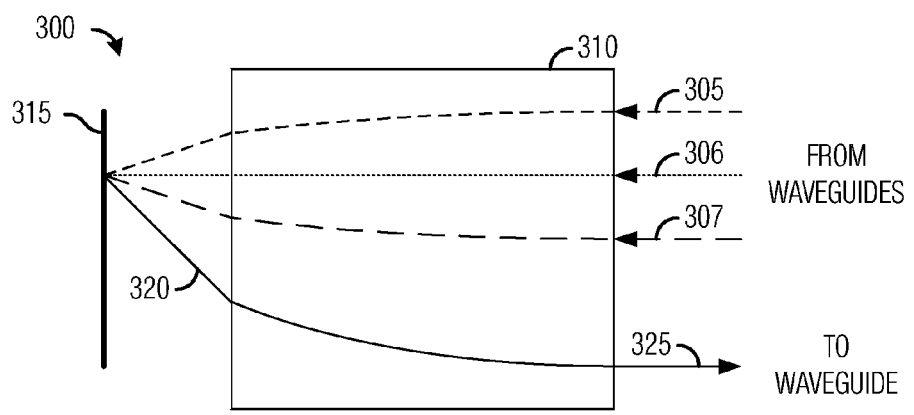
*Fig. 3a*

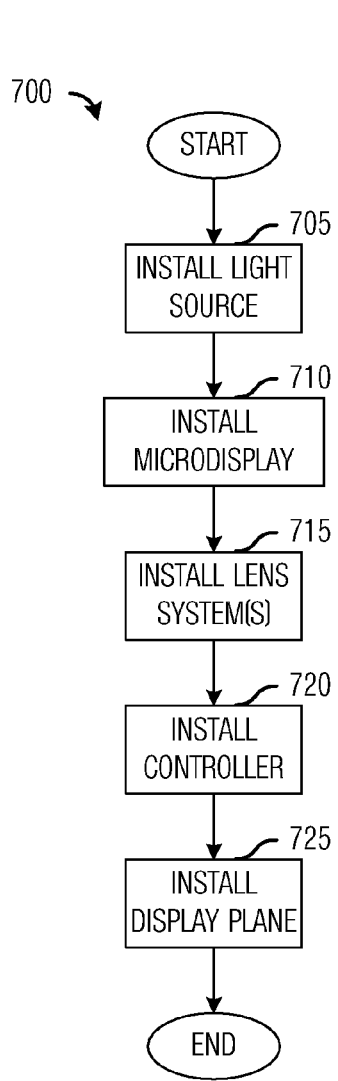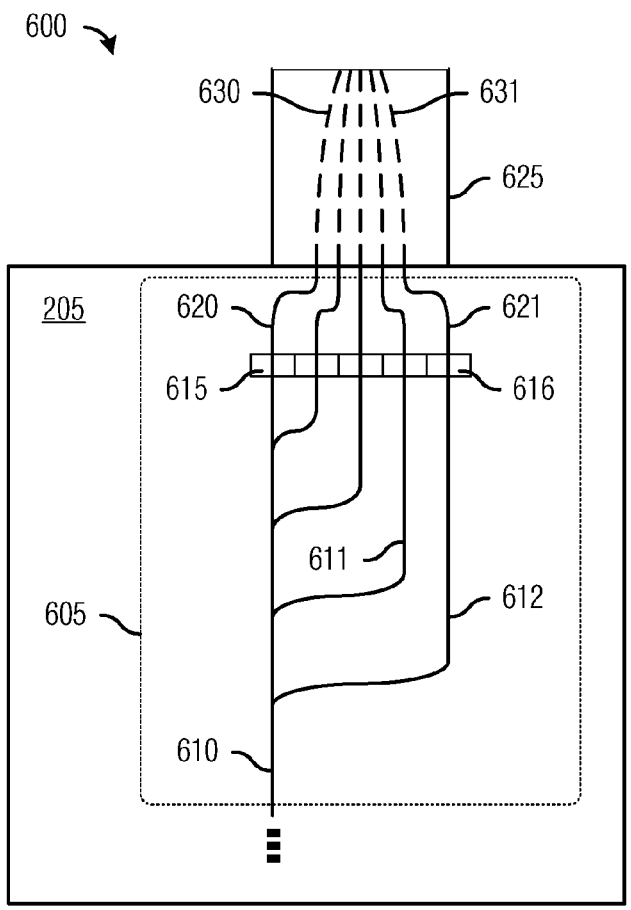
*Fig. 6*
*Fig. 7a*
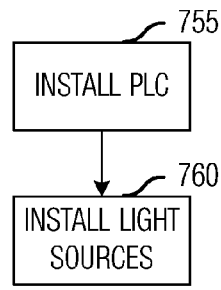
*Fig. 7b*
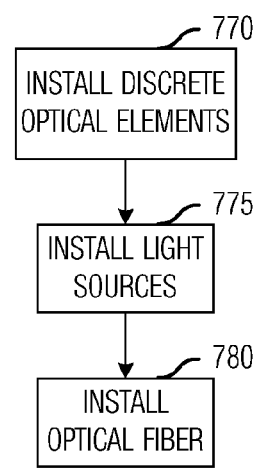
*Fig. 7c*

ILLUMINATION SOURCE AND METHOD THEREFOR

TECHNICAL FIELD

The present invention relates generally to a system and method for displaying images, and more particularly to an illumination source and a method therefor.

BACKGROUND

A typical illumination source for a display system makes use of one or more light sources that may include electric arc lamps, light emitting diodes, lasers, and other forms of solid-state lights, and so forth, to provide needed light. The light may be used to project an image created by a microdisplay, for example, onto a display plane. A digital micromirror device (DMD), one type of microdisplay, contains a large number of micromirrors that may individually pivot between an on state and an off state depending on an image being displayed, reflecting the light either onto or away from the display plane. The DMD, controlling the light reflected onto and away from the display plane, creates a projection of the image on the display plane.

The light from the light sources may be combined using beam shaping free space optics and dichroic technology. For example, optical lenses, filters, gratings, beam splitters, and so forth, may be used to focus, collimate, combine, split, filter, and otherwise process or manipulate the light from the light sources into a condition suitable for use in a display system.

The use of free space optics and dichroic technology has enabled fully operable illumination sources. However, with a continued push for smaller display systems, even pocket-sized display systems, the physical size of illumination sources using free space optics and dichroic technology may hamper the development of extremely small display systems.

SUMMARY OF THE INVENTION

These and other problems are generally solved or circumvented, and technical advantages are generally achieved, by embodiments of an illumination source and a method therefor.

In accordance with an embodiment, a light source is provided. The light source includes a light circuit and a lighting element optically coupled to the light circuit. The light circuit processes light and propagates light using light guides. The lighting element provides multiple colors of light.

In accordance with another embodiment, a display system is provided. The display system includes a monolithic light source to produce light, a light modulator optically coupled to the monolithic light source and positioned in a light path of the monolithic light source after the monolithic light source, and a controller electronically coupled to the light modulator and to the monolithic light source. The light modulator produces images on a display plane by modulating light from the monolithic light source based on image data, and the controller issues modulator commands to the light modulator based on the image data. The monolithic light source includes a lighting element that provides multiple colors of light, and a light circuit. The light circuit includes optical processing elements that manipulate the multiple colors of light, and light guides coupled to the optical processing elements and to the lighting element, wherein the light guides propagate light.

In accordance with another embodiment, a method of manufacturing a display system is provided. The method includes installing a monolithic light source, installing an optics system optically coupled to the monolithic light source and in a light path of the monolithic light source, installing a microdisplay optically coupled to the optics system and in the light path after the optics system, and installing a controller electrically coupled to the microdisplay. The monolithic light source comprises light guides to internally propagate light.

An advantage of an embodiment is that the illumination source may be made small due to a reduction (or elimination) in the use of free space optics and dichroic technology, such as large optical lenses, filters, gratings, and so forth.

A further advantage of an embodiment is a reduction in mechanical tolerances and the continued maintenance of illumination sources has largely been eliminated. Generally, for example, there are no large optical lenses to be knocked out of alignment, mechanical devices to wear out, and so forth.

Yet another advantage of an embodiment is that the manufacture of the illumination sources has been simplified due to the elimination of many assembly steps. Furthermore, many mechanical tolerances have been removed. Therefore, the illumination sources may become significantly less expensive.

Another advantage of an embodiment is that many optical management requirements of an illumination system, such as modulation, speckle reduction, color combination, and so on, may be integrated into a single substrate. This may allow wafer fabrication techniques to be applied, leading to further cost reductions.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 2a is a diagram of a monolithic light source;

FIGS. 2b through 2d are diagrams of alternate light elements;

FIGS. 3a and 3b are diagrams of single optical grating systems for combining different wavelengths of light;

FIG. 6 is a diagram of a portion of a monolithic light source used for speckle reduction; and FIGS. 7a through 7c are diagrams of sequences of events in the manufacture of a display system.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a laser illumination source for use in a DMD-based display system. The invention may also be applied, however, to illumination sources using other forms of illumination, such as electric arc lamp, light emitting diode and other solid-state light sources, as well as other forms of coherent light. The illumination source may be used in other forms of display systems, such as those utilizing transmissive or reflective liquid crystal displays, liquid crystal on silicon, ferroelectric liquid-crystal-on-silicon, deformable micromirrors, and other forms of microdisplays and spatial light modulators. Furthermore, the illumination source may be used in applications wherein there is a need for a well controlled source of light. For example, the illumination source may be used in a flying spot display, wherein images may be created on a display screen using a high-energy light beam, such as a laser, with each pixel represented by a narrow pulse of light or lack of light, in each specific location.

Figure 1A:
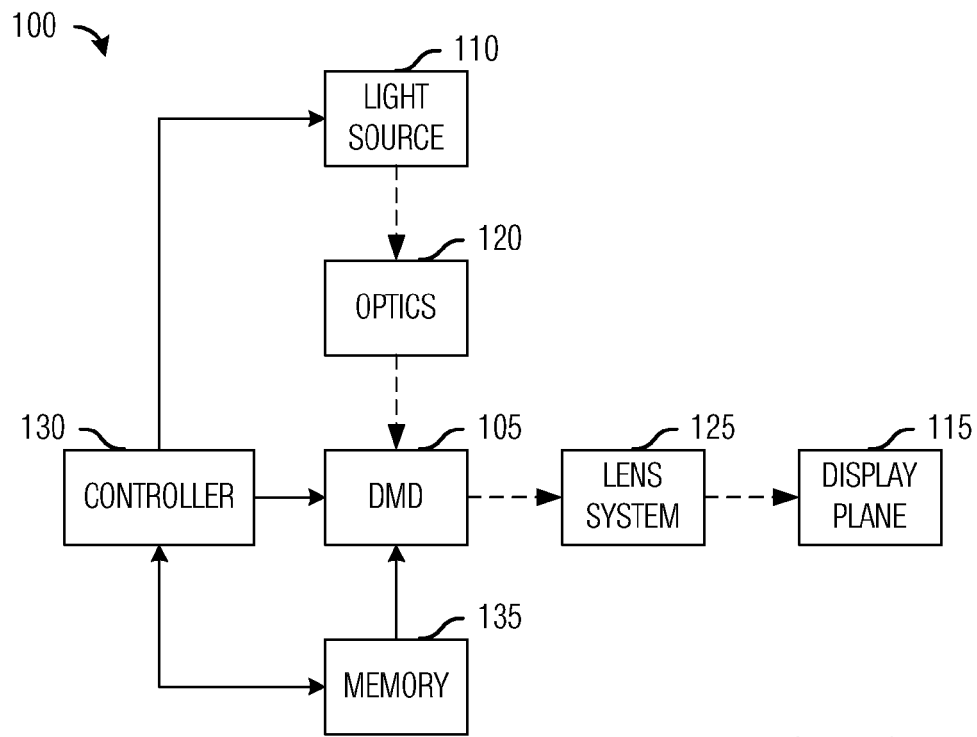
FIG. 1a is a diagram of a projection display system.

With reference now to FIG. 1a, there is shown a high-level diagram illustrating an exemplary DMD-based projection display system 100. The DMD-based projection display system 100 includes a DMD 105 that modulates light produced by a light source 110. The DMD 105 is an example of a microdisplay or an array of light modulators. Other examples of microdisplays may include transmissive or reflective liquid crystal, liquid crystal on silicon, ferroelectric liquid-crystal-on-silicon, deformable micromirrors, and so forth. In a microdisplay, a number of light modulators may be arranged in a rectangular, square, diamond shaped, and so on, array.

Each light modulator in the microdisplay may operate in conjunction with the other light modulators in the microdisplay to modulate the light produced by the light source 110. The light modulated by the DMD 105 may be used to create images on a display plane 115. The DMD-based projection display system 100 also includes an optics system 120, which may be used to collimate the light produced by the light source 110 as well as to collect stray light, and a lens system 125, which may be used to manipulate (for example, focus) the light reflecting off the DMD 105.

The DMD 105 may be coupled to a controller 130, which may be responsible for loading image data into the DMD 105, controlling the operation of the DMD 105, providing micromirror control commands to the DMD 105, controlling the light produced by the light source 110, and so forth. A memory 135, which may be coupled to the DMD 105 and the controller 130, may be used to store the image data, as well as configuration data, color correction data, and so forth.

Figure 1B:
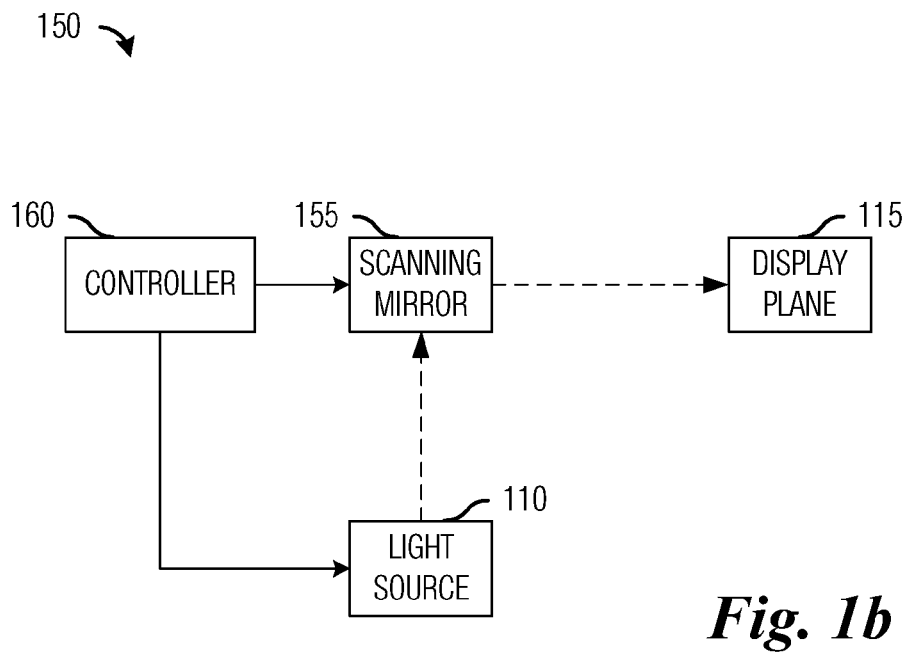
FIG. 1b is a diagram of a flying spot display system.

FIG. 1b illustrates an exemplary flying spot display system 150. In the flying spot display system 150, a scanning mirror 155, operating as a light modulator, may rapidly move about two axes to scan light from the light source 110 onto the display plane 115. The scanning mirror 155 may comprise a single mirror that may be capable of movement along two axes or two mirrors, each capable of movement along one of the two axes. Typically, the axes may be orthogonal. The light from the light source 110 may be time modulated to create individual pixels and a viewer's eyes may integrate the light on the display plane 115 to create an image. A controller 160 may be used to control the scanning of the scanning mirror 155 as well as a modulation of the light source 110. The controller 160 may control the scanning of the scanning mirror 155 by issuing modulator control commands as well as the modulation of the light source 110. Both the control of the scanning mirror 155 and the light source 110 may be based on the image data. A flying spot display operates in a manner similar to a cathode-ray tube display, with beams of electrons are scanned over a phosphor coated display plane rather than a light beam scanned over a display plane.

FIG. 2a illustrates a monolithic light source 200. The light source 200 may be used to provide a collimated white light. The light source 200 comprises a planar lightwave circuit 204 (PLC) fabricated on a substrate 205. The PLC 204 is a form of light circuit formed on the substrate 205. The substrate 205 may be formed from lithium niobate ($LiNbO_3$). In addition to lithium niobate, other materials may be used to form the substrate, including magnesium oxide doped lithium niobate ($MgO:LiNbO_3$), zinc oxide doped lithium niobate ($ZnO:LiNbO_3$), iron doped lithium niobate ($Fe:LiNbO_3$), and combinations thereof. Other types of materials that may be used to form the substrate may include: lithium tantalite (LTA), lithium triborate (LBO), beta-barium borate (BBO), potassium titanyl phosphate (KTP), and combinations thereof.

It may be possible to locally dope the substrate 205 with ions such as magnesium (Mg), iron (Fe), zinc (Zn), hafnium (Hf), copper (Cu), gadolinium (Gd), erbium (Er), yttrium (Y), manganese (Mn) and boron (B) to increase the index of refraction of the substrate and create waveguides, such as waveguides 210-214. It may also be possible to directly pattern the waveguides 210-214 onto the substrate 205. For example, the waveguides 210-214 may be patterned onto the substrate 205 by techniques such as etching, photolithography, doping, and so forth. Additionally, the use of a photonic crystal lattice may yield similarly performing waveguides.

Light from lasers 215-217 may be coupled into the waveguides 210-212 on the substrate 205 by couplers 220-222. The lasers 215-217 may each produce light at a different wavelength. For example, laser 215 may produce light in a red wavelength, laser 216 may produce light in a green wavelength, and laser 217 may produce light in a blue wavelength. Although shown to include three lasers, the light source 200 may combine light for any number of lasers. For example, the light source 200 may combine light from two, four, five, six, and so forth, lasers. Additionally, other light sources may be used in place of lasers. FIGS. 2b through 2d illustrate portions of alternate light sources, such as light emitting diodes or some other form of solid-state light source, electric arc lamps, and so on, may be used in place of lasers. Light from the light emitting diodes, solid-state light source, electric arc lamp, and so forth, may be coupled into the PLC 204 by the coupler 220. Therefore, the illustration and discussion of three lasers should not be construed as being limiting to either the scope or the spirit of the present invention. The couplers 220-222 may be butt-couplers or sphere lenses, for example.

A coupler 225 may be used to combine (process or manipulate) light from the laser 215 with light from the laser 216 and a coupler 226 may be used to combine light from the laser 217 with the combined light from the lasers 215 and 216. The couplers 225 and 226, when created on the substrate 205, may be examples of integrated light processing elements. Examples of the couplers 225 and 226 may be couplers that are Bragg-based or Fabry-Perot-based. Additionally, common integrated dichroic couplers that may have been tuned to couple light from a first waveguide to a second waveguide using evanescent waves may also be used as couplers 225 and 226. The couplers 225-226 may be tuned so that an interaction length may be set to enable a total transfer of light of a specific wavelength from a first waveguide to a second waveguide and may be used to combine light from the lasers 215-216. Other examples of light processing performed by the PLC 204 (a light circuit) may be filtering, focusing, scattering, diffusing, splitting, combining, and so on.

The couplers 225 and 226 may be formed on the substrate 205 by local doping of the substrate 205. The doping of the substrate 205 may be performed utilizing the materials used to create the waveguides, and may include ions such as magnesium (Mg), iron (Fe), zinc (Zn), hafnium (Hf), copper (Cu), gadolinium (Gd), erbium (Er), yttrium (Y), manganese (Mn) and boron (B). The couplers 225 and 226 may also be formed by alternating different materials including the different substrate materials including lithium niobate ($LiNbO_3$), magnesium oxide doped lithium niobate ($MgO:LiNbO_3$), zinc oxide doped lithium niobate ($ZnO:LiNbO_3$), iron doped lithium niobate ($Fe:LiNbO_3$), lithium tantalite (LTA), lithium triborate (LBO), beta-barium borate (BBO), potassium titanyl phosphate (KTP), and combinations thereof along the waveguides 210-213. Air, vacuum, and a variety of gasses may also be used in the couplers 225 and 226. Slices of waveguide material may be removed, leaving a gap (gaps) to be filled with air, vacuum, various gasses, and so forth, to function as a waveguide. Additionally, creating periodic stress on the waveguides 210-213 may also be used to form couplers. Bragg-based and Fabry-Perot-based couplers as well as the other techniques discussed herein are considered to be well understood by those of ordinary skill in the art of the present invention.

Light output from the coupler 226, traveling in the waveguide 214, may then exit the substrate 205 and be provided to a lens 230. The lens 230 may be used to collimate the light, forming a collimated white light 235. The lens 230 may be a graded index (GRIN) lens or an aspheric lens, for example. The lens 230 and the waveguide 214 may be butt-coupled together using an index matching material. Alternatively, an antireflective coating (AR) may be applied to the end of the waveguide 214 and the lens 230 may then be butt-coupled to the waveguide 214. Another technique may involve the use of an optical fiber coupled at one end to the waveguide 214 and then the lens 230 may be attached to the optical fiber at another end.

Since the waveguides 210-214 and the couplers 225 and 226 may be formed in the substrate 205 or on the substrate 205, they may be less sensitive to misalignment than comparable free space optics and dichroic elements. Additionally, the couplers 225 and 226 may be made smaller in size than comparable free space elements, thereby enabling the light source 200 to be smaller than a similar light source utilizing free space optical elements. Furthermore, since light from the lasers 215-217 are propagating in the waveguides 210-214 and may not disperse to the extent that they may when propagating in free space, the amount of light loss in the light source 200 due to light dispersion may be less than a similar light source utilizing free space optical elements. These advantages and others may yield a light source that may be smaller, more robust, and brighter than a similar light source utilizing free space optical elements.

The monolithic light source 200 may be constructed so that the lasers 215-217 and the couplers 220-222, along with other elements, are placed on a board, a circuit board, a circuit module, and so forth, with the substrate 205. The combination of the lasers 215-217, the couplers 220-222, and the substrate 205 on a board may create a single monolithic entity that may help to improve the reliability of the light source 200 by reducing susceptibility to shock and vibration while potentially reducing mechanical manufacturing tolerances. In another embodiment, the lasers 215-217 and the couplers 220-222 may be fabricated on the substrate 205 along side the discrete optical components and waveguides.

Figure 3B:
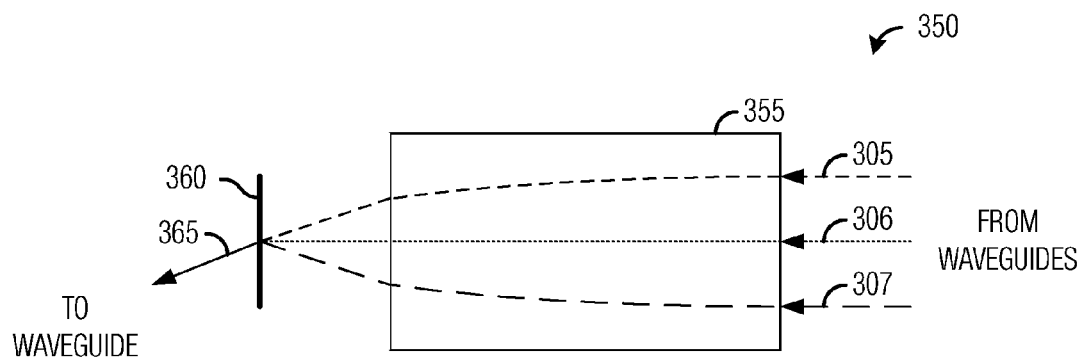

FIGS. 3a and 3b illustrate diagrams of single optical grating systems for combining different wavelengths of light. FIG. 3a illustrates a single optical grating system 300 with a reflective grating. In the single optical grating system 300, light beams 305-307 of different wavelengths of light may be incident on a lens 310. The lens 310 may be an aspherical lens or a GRIN lens, for example. After traversing the lens 310, the light beams 305-307 traverse free space and reflect off a reflective grating 315. The reflective grating 315 may effectively combine the light beams 305-307 into a single beam 320 that traverses back through the lens 310, exiting the lens 310 as a collimated white light beam 325.

Similarly, a single optical grating system 350 shown in FIG. 3b may make use of a transmission grating to produce collimated white light. Light beams 305-307 traverse through a lens 355, which may be similar to the lens 310, and as the light beams 305-307 exit the lens 355, they become incident to a transmission grating 360. As the light beams 305-307 pass through the transmission grating 360, they may be combined into a single beam 365 of collimated white light.

Figure 4:
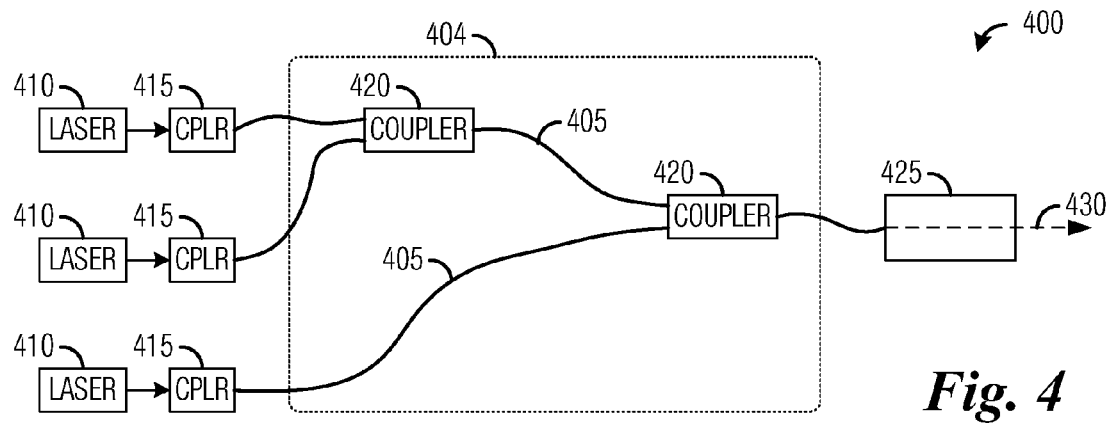
FIG. 4 is a diagram of a monolithic light source utilizing optical fiber.

In the light source 200 fabricated as a PLC, optical elements such as the waveguides 210-214 and the couplers 225 and 226, may be fabricated directly on the substrate 205. This may be analogous to an integrated circuit, wherein multiple circuit elements are fabricated on a substrate. It may also be possible to implement a similar light source utilizing discrete optical components. FIG. 4 illustrates a light source 400 created using discrete optical components. Optical fiber 405 may function as waveguides for light from lasers 410 that may be coupled into the optical fiber 405 via couplers 415. The optical fiber 405 may be used as optical interconnects between discrete optical elements, such as couplers 420 and a lens 425. The couplers 420 may be discrete implementations of Bragg-based and Fabry-Perot-based couplers and may be used to combine light at their respective inputs, while the lens 425 may be a GRIN lens and may create a collimated white light beam 430 from a combination of light from the lasers 410. The optical elements, such as couplers 420 and lens 425, as well as the optical fiber 405 may be mounted on a backer board, a printed circuit board, or so forth, to provide mechanical stability for the light source 400. Collectively, the discrete optical elements, such as couplers 420, and the optical fiber 405, along with the board, circuit board, backer board, circuit module, and so forth, may form a light circuit 404. The light source 400 may be formed into a monolithic light source by attaching the discrete optical components, such as the couplers 420, the optical fiber 405, as well as the lasers 410 and the couplers 415 to a board, a circuit board, a circuit module, or so on.

Figure 5:
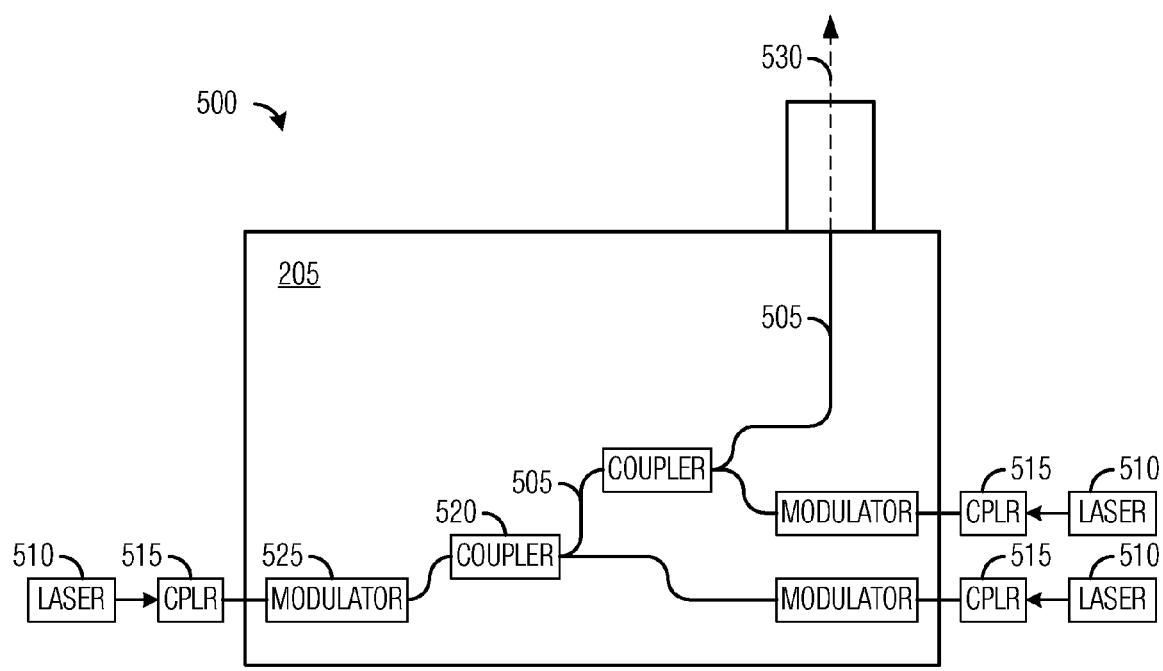
FIG. 5 is a diagram of a monolithic light source with light modulation functionality.

A light source, fabricated as a PLC, may also include functionality beyond producing collimated white light. FIG. 5 illustrates a monolithic light source 500 fabricated on a substrate 205 with a capability to modulate light. The light source 500 includes a waveguide 505 functioning to direct light, from lasers 510, for example, and coupled into the waveguide 505 with a coupler 515, between various integrated optical elements. A coupler 520, such as a Bragg-based or Fabry-Perot-based coupler, may be used to combine multiple light beams into a single light beam. Furthermore, coupling via evanescent waves may also be used. If the light source 500 were to be created using discrete optical elements and fiber optics, then a fused bi-conical taper (FBT) coupler may be used.

A modulator 525 may be used to modulate light from the laser 510. The modulator 525 may be a Mach-Zender interferometer and may be used to modulate light at one of several inputs to the modulator 525. The modulator 525, when created on the substrate 205, may be examples of integrated light processing elements. In addition to the Mach-Zender interferometer, other techniques may be employed to modulate light produced by the laser 510, including a switchable Bragg grating, a variable coupler, a Pockel cell, and so forth. The modulator 525 may effectively switch the light from the laser 510 on or off as desired, by adding a 180 degrees out-of-phase version of a light wave to itself, for example. Therefore, a light beam 530 may be a light beam without light from one or more of the lasers 510. For example, to produce a light beam with purely one color of light, light from the other two lasers of the light source 500 may be eliminated by respective modulators 525.

FIG. 6 illustrates a speckle reduction circuit 605 of a light source 600, wherein the light source 600 and the speckle reduction circuit 605 may be fabricated on a substrate 205. The speckle reduction circuit 605 may be located at an output end of the light source 600, prior to an output light exiting the light source 600, for example. The speckle reduction circuit 605 includes a waveguide 610 that may be split into a plurality of separate waveguides, such as waveguide 611 and waveguide 612. The waveguides may then be passed through a set of electrodes. When an electric potential is applied across the electrodes, an electric field may be generated that may modify the material's refractive index. This may alter a delay in the light, creating a phase shift. Each electrode may impart a random phase shift (truly random, pseudo-random, periodic with different periods, and so forth) on light carried within the waveguide passing through the electrode. For example, electrode 616 may impart a first random phase shift on the light carried in the waveguide 612. Similarly, electrode 615 may impart a second random phase shift. Preferably, a random phase shift imparted by an electrode should have no relationship with the random phase shifts imparted by other electrodes. The electrodes, when created on the substrate 205, may be examples of integrated light processing elements.

Waveguides leading from the electrodes, such as waveguides 620 and 621, may then provide the light to a lens 625, such as a GRIN lens. Output from the lens 625 may be a set of multiple beams of light, such as beam 630 and beam 631, with the light beams having different phase angles and a random phase relationship.

In addition to collimation, light modulation, and speckle reduction, a light source fabricated using a PLC may also be used to convert a light's wavelength. For example, it may be possible to convert infrared (IR) light to visible light. Visible light in a variety of colors may be provided to a PLC and may be combined with visible light generated from an IR light located on the PLC. A non-linear substrate, such as one made from lithium niobate (LNB), lithium tantalite (LTA), lithium triborate (LBO), beta-barium borate (BBO), potassium titanyl phosphate (KTP), and combinations thereof, may be used to perform non-linear operations on an IR light beam on the PLC. Examples of such operations may include second harmonic generation (SHG), sum frequency generation (SFG), difference frequency generation (DFG), parametric amplification and parametric oscillation by patterning waveguides, periodically or quasi-periodically poled structures, optical parametric oscillators (OPO), optical parametric amplifiers (OPA), and so forth. The non-linear operations may be used to generate any color or any set of colors of light desired, such as red, green, and/or blue.

FIG. 7a illustrates a sequence of events 700 in the manufacture of an exemplary display system with monolithic light source. The manufacture of the display system may begin with installing a monolithic light source (for example, the light source 200 fabricated on a PLC, or the light source 400 installed on a backer board or circuit board), which may produce multiple colors of light (block 705). The manufacture may continue with installing a microdisplay, for example, DMD 105 (block 710) in the light path of the multiple colors of light produced by the light source (block 705). A lens and/or optics system, such as the optics system 120 and the lens system 125 may next be installed (block 715). A controller, such as the controller 130, for the display system may then be installed in the light path of the multiple colors of light (block 720). Finally, a display plane, such as display plane 115, may be installed (block 725). The order of the events in this sequence may be changed, the sequence may be performed in a different order, or some of the steps may be performed at the same time to meet particular manufacturing requirements of the various embodiments of the DMD, for example.

The installation of the monolithic light source, block 705, may differ depending on the type of light source being installed. FIG. 7b illustrates the installation of a light source fabricated from a PLC. The installation may include the installation of a PLC that contains optical elements such as waveguides and optical processing elements (block 765) and light sources, such as lasers, light emitting diodes, and so forth (block 760). FIG. 7c illustrates the installation of a light source containing discrete optical elements. The installation may include the installation of discrete optical elements (block 770), and light sources, such as lasers, light emitting diodes, and so forth (block 775) on the back board or circuit board, and then optical fiber to connect the light sources to the discrete optical elements (block 780).

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A light source comprising:
   a light circuit configured to process light and propagate light, wherein the light circuit propagates light using light guides, the light circuit comprising:
      an integrated light processing element formed on the substrate, the light processing element configured to process light from the lighting element, the light processing element comprising:

a first coupler having a first input and a second input, the first coupler to combine a first light beam at the first input and a second light beam at the second input into a first combined light beam at a first output;

a second coupler having a third input and a fourth input coupled to the first coupler, the second coupler to combine a third light beam at the third input and the first combined light beam at the fourth input into a second combined light beam at a second output;

a first modulator coupled between a first lighting element and the first input of the first coupler, the first modulator configured to selectively block a transmission of the first light beam;

a second modulator coupled between a second lighting element and the second input of the first coupler, the second modulator configured to selectively block a transmission of the second light beam; and a third modulator coupled between a third lighting element and the third input of the second coupler, the third modulator configured to selectively block a transmission of the third light beam;

an integrated waveguide formed on the substrate, the waveguide to propagate light from the lighting element to the light processing element; and a lighting element optically coupled to the light circuit, the lighting element to provide multiple colors of light.

2. The light source of claim 1, wherein the lighting element is selected from the group consisting of: lasers, light emitting diodes, electric arc lamps, solid-state lights, and combinations thereof.

3. The light source of claim 1, wherein the light circuit is a planar lightwave circuit formed on a substrate.

4. The light source of claim 1, wherein the substrate is selected from the group consisting of: lithium niobate (LNB), ion-doped lithium niobate, lithium tantalite (LTA), lithium triborate (LBO), beta-barium borate (BBO), potassium titanyl phosphate (KTP), and combinations thereof.

5. The light source of claim 1, wherein the first coupler and the second coupler are selected from the group consisting of: Bragg based couplers, Fabry-Perot based couplers, couplers containing doped regions of the substrate, couplers containing air gaps, couplers containing pre-stressed regions of the substrate, and combinations thereof.

6. The light source of claim 1, wherein the first modulator, the second modulator, and the third modulator are selected from the group consisting of: Mach-Zender modulators, switchable Bragg gratings, variable couplers, couplers using evanescent waves, and combinations thereof.

7. The light source of claim 1, further comprising a lens optically coupled to an output waveguide of the light processing element, the lens configured to collimate light produced by the light processing element.

8. The light source of claim 1, wherein the light circuit comprises:
a discrete light processing element configured to process light from the lighting element; and
an optical fiber coupled to the light processing element and to the lighting element, the optical fiber to propagate light from the lighting element to the light processing element.

9. The light source of claim 1, further comprising a speckle reduction unit coupled to an output waveguide of the light processing element, the speckle reduction unit comprising:

a plurality of intermediate waveguides, wherein each intermediate waveguide is coupled in parallel to the output waveguide; and a plurality of electrodes, wherein each electrode is coupled to an intermediate waveguide of the plurality of intermediate waveguides, and wherein each respective electrode creates a phase shift pattern on a propagated light beam propagated by an intermediate waveguide coupled to the electrode.

10. The light source of claim 9, wherein a first phase shift pattern created by an electrode of the plurality of electrodes is different from phase shift patterns created by other electrodes of the plurality of electrodes.

11. A light source comprising:
a light circuit configured to process light and propagate light, wherein the light circuit propagates light using light guides, the light circuit comprising:
an integrated light processing element formed on the substrate, the light processing element configured to process light from the lighting element; and
an integrated waveguide formed on the substrate, the waveguide to propagate light from the lighting element to the light processing element; and
a lighting element optically coupled to the light circuit, the lighting element to provide multiple colors of light; and
a speckle reduction unit coupled to an output waveguide of the light processing element, the speckle reduction unit comprising:
a plurality of intermediate waveguides, wherein each intermediate waveguide is coupled in parallel to the output waveguide; and
a plurality of electrodes, wherein each electrode is coupled to an intermediate waveguide of the plurality of intermediate waveguides, and wherein each respective electrode creates a phase shift pattern on a propagated light beam propagated by an intermediate waveguide coupled to the electrode.

12. The light source of claim 11, wherein the light processing element comprises:
a first coupler having a first input and a second input, the first coupler to combine a first light beam at the first input and a second light beam at the second input into a first combined light beam at a first output; and
a second coupler having a third input and a fourth input coupled to the first coupler, the second coupler to combine a third light beam at the third input and the first combined light beam at the fourth input into a second combined light beam at a second output.

13. The light source of claim 12, wherein the first coupler and the second coupler are selected from the group consisting of: Bragg based couplers, Fabry-Perot based couplers, couplers containing doped regions of the substrate, couplers containing air gaps, couplers containing pre-stressed regions of the substrate, and combinations thereof.

14. The light source of claim 11, wherein a first phase shift pattern created by an electrode of the plurality of electrodes is different from phase shift patterns created by other electrodes of the plurality of electrodes.

15. The light source of claim 11, wherein the lighting element is selected from the group consisting of: lasers, light emitting diodes, electric arc lamps, solid-state lights, and combinations thereof.

16. The light source of claim 11, wherein the light circuit is a planar lightwave circuit formed on a substrate selected from the group consisting of: lithium niobate (LNB), ion-doped lithium niobate, lithium tantalite (LTA), lithium triborate (LBO), beta-barium borate (BBO), potassium titanyl phosphate (KTP), and combinations thereof.

17. The light source of claim 11, further comprising a lens optically coupled to an output waveguide of the light processing element, the lens configured to collimate light produced by the light processing element.

18. The light source of claim 11, wherein the light circuit comprises:
   a discrete light processing element configured to process light from the lighting element; and
   an optical fiber coupled to the light processing element and to the lighting element, the optical fiber to propagate light from the lighting element to the light processing element.

19. The light source of claim 11, further comprising a lens optically coupled to an output waveguide of the light processing element, the lens configured to collimate light produced by the light processing element.

20. The light source of claim 11, wherein the light circuit comprises:
   a discrete light processing element configured to process light from the lighting element; and
   an optical fiber coupled to the light processing element and to the lighting element, the optical fiber to propagate light from the lighting element to the light processing element.

* * * * *